(12) United States Patent
Mullen et al.

(10) Patent No.: US 10,730,557 B2
(45) Date of Patent: Aug. 4, 2020

(54) CROSS CAR BEAM ASSEMBLY WITH COMPOSITE BEAM STRUCTURE AND REINFORCEMENT

(71) Applicant: Ford Global Technologies, LLC, Dearborn, MI (US)

(72) Inventors: Gary D. Mullen, Plymouth, MI (US); Anthony Ligi, Jr., Chelsea, MI (US); Li Lu, Bloomfield Hills, MI (US); Nicholas Andrew Mazzocchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 15/837,606

(22) Filed: Dec. 11, 2017

(65) Prior Publication Data

US 2019/0176889 A1 Jun. 13, 2019

(51) Int. Cl.
| | |
|---|---|
| *B62D 21/03* | (2006.01) |
| *B62D 21/15* | (2006.01) |
| *B62D 25/20* | (2006.01) |
| *B62D 27/06* | (2006.01) |
| *B62D 29/04* | (2006.01) |
| *B62D 25/14* | (2006.01) |
| *B62D 27/02* | (2006.01) |

(52) U.S. Cl.
CPC ............ *B62D 21/03* (2013.01); *B62D 21/15* (2013.01); *B62D 25/145* (2013.01); *B62D 25/2009* (2013.01); *B62D 27/023* (2013.01); *B62D 27/065* (2013.01); *B62D 29/041* (2013.01); *B62D 29/046* (2013.01); *B62D 29/048* (2013.01); *B60Y 2410/122* (2013.01)

(58) Field of Classification Search
CPC ...... B62D 21/03; B62D 21/15; B62D 25/145; B62D 25/2009; B62D 27/065; B62D 29/041; B62D 29/048
USPC ..................................................... 296/193.02
See application file for complete search history.

(56) References Cited

U.S. PATENT DOCUMENTS

| | | | | |
|---|---|---|---|---|
| 4,591,400 | A * | 5/1986 | Fradenburgh | B29C 33/48 156/80 |
| 5,143,472 | A * | 9/1992 | Reed | E04F 11/1814 403/230 |
| 5,282,637 | A * | 2/1994 | McCreadie | B62D 1/16 248/224.61 |
| 5,285,612 | A * | 2/1994 | Johnson | A47B 47/04 403/346 |
| 5,329,871 | A * | 7/1994 | Gibbs | B63B 29/04 114/363 |
| 5,931,520 | A * | 8/1999 | Seksaria | B60R 21/045 280/752 |

(Continued)

FOREIGN PATENT DOCUMENTS

| | | | |
|---|---|---|---|
| CN | 205345134 U | * 6/2016 | |
| EP | 2159109 A1 | * 3/2010 | ............ B60R 13/08 |
| JP | 61241263 A | * 10/1986 | |

*Primary Examiner* — Hilary L Gutman
(74) *Attorney, Agent, or Firm* — David Coppiellie; Price Heneveld LLP (57) ABSTRACT

A cross car beam assembly is provided herein. A composite beam structure extends transversely across a vehicle. A vehicle floor bracket is disposed below the composite beam. A composite reinforcement has a first portion fixedly engaged to the beam structure and a second portion engaged to the vehicle floor bracket.

14 Claims, 6 Drawing Sheets

(56) References Cited

U.S. PATENT DOCUMENTS

| | | | |
|---|---|---|---|
| 5,934,733 A | 8/1999 | Manwaring | |
| 6,065,261 A * | 5/2000 | Fehr | B61D 17/005 |
| | | | 105/401 |
| 6,110,037 A * | 8/2000 | Yoshinaka | B60H 1/0055 |
| | | | 454/143 |
| 6,155,631 A * | 12/2000 | Yoshinaka | B62D 25/142 |
| | | | 296/1.03 |
| 6,176,544 B1 * | 1/2001 | Seksaria | B60R 21/045 |
| | | | 280/752 |
| 6,273,495 B1 | 8/2001 | Haba et al. | |
| 6,315,347 B1 * | 11/2001 | Gotz | B62D 25/147 |
| | | | 296/203.02 |
| 6,450,533 B1 * | 9/2002 | Kimura | B62D 25/145 |
| | | | 180/90 |
| 6,517,139 B2 * | 2/2003 | Sutou | B60K 37/00 |
| | | | 296/70 |
| 6,523,878 B2 * | 2/2003 | Scheidel | B62D 25/145 |
| | | | 180/90 |
| 6,560,872 B2 * | 5/2003 | Morrison | B62D 25/145 |
| | | | 29/458 |
| 6,685,259 B1 * | 2/2004 | Shimase | B60R 16/0215 |
| | | | 296/192 |
| 6,694,700 B1 * | 2/2004 | Mackett | E04B 1/0046 |
| | | | 403/205 |
| 6,837,518 B2 | 1/2005 | Mullan | |
| 6,868,641 B2 * | 3/2005 | Conner | E01F 9/635 |
| | | | 52/165 |
| 6,869,135 B2 * | 3/2005 | Forssell | B62D 29/008 |
| | | | 296/203.03 |
| 6,886,296 B1 * | 5/2005 | John | E02D 5/60 |
| | | | 248/519 |
| 6,988,764 B2 | 1/2006 | Matsutani | |
| 7,125,002 B2 * | 10/2006 | Platt | E04H 17/1421 |
| | | | 256/65.04 |
| 7,320,290 B2 * | 1/2008 | Watanabe | B62D 25/145 |
| | | | 114/144 R |
| 7,503,622 B2 * | 3/2009 | Vican | B62D 25/145 |
| | | | 296/190.03 |
| 7,516,986 B2 * | 4/2009 | Kokubo | B62D 25/145 |
| | | | 280/779 |
| 7,568,756 B2 * | 8/2009 | Meier | B62D 25/145 |
| | | | 296/193.02 |
| 7,891,707 B2 * | 2/2011 | Kuwano | B62D 25/145 |
| | | | 280/779 |
| 8,029,045 B2 * | 10/2011 | Merkle | B62D 25/145 |
| | | | 296/193.02 |
| 8,100,463 B2 * | 1/2012 | Penner | B62D 25/145 |
| | | | 296/193.02 |
| 8,746,787 B2 * | 6/2014 | Adamski | B62D 25/06 |
| | | | 296/210 |
| 8,801,087 B2 * | 8/2014 | Kim | B62D 25/145 |
| | | | 296/193.02 |
| 8,959,857 B1 * | 2/2015 | Lin | E04H 12/2261 |
| | | | 256/65.14 |
| 8,998,307 B1 * | 4/2015 | Joyce | B62D 29/008 |
| | | | 296/193.12 |
| 9,004,439 B2 * | 4/2015 | Gross | E04H 12/2269 |
| | | | 248/507 |
| 9,347,196 B2 * | 5/2016 | Wagler | E02D 27/42 |
| 9,365,244 B2 * | 6/2016 | Appasamy | B62D 25/145 |
| 10,106,200 B2 * | 10/2018 | Curk | B62D 29/008 |
| 2004/0108744 A1 * | 6/2004 | Scheib | B62D 25/142 |
| | | | 296/70 |
| 2005/0264040 A1 | 12/2005 | Bailey et al. | |
| 2006/0054393 A1 * | 3/2006 | Eisenkrein | E04G 21/3204 |
| | | | 182/113 |
| 2006/0261508 A1 | 11/2006 | Lustiger et al. | |
| 2007/0295453 A1 * | 12/2007 | Koelman | B29C 66/54 |
| | | | 156/331.8 |
| 2015/0284081 A1 * | 10/2015 | Cook | B60R 7/14 |
| | | | 89/37.16 |
| 2019/0111872 A1 * | 4/2019 | Newcomb | B60R 19/03 |

\* cited by examiner

CROSS CAR BEAM ASSEMBLY WITH COMPOSITE BEAM STRUCTURE AND REINFORCEMENT

FIELD OF THE DISCLOSURE

The present disclosure generally relates to a cross car beam assembly for a vehicle, and more particularly, to a cross car beam assembly formed with composites.

BACKGROUND OF THE DISCLOSURE

Conventional cross car beam assemblies are typically manufactured from metal components welded or adhered together. The resulting assembly is both heavy and restrictive in design. Accordingly, there is a need for a lightweight cross car beam assembly and method of manufacture that imparts greater design flexibility without sacrificing structural integrity. The present disclosure is intended to satisfy this need.

SUMMARY OF THE DISCLOSURE

According to a first aspect of the present disclosure, a cross car beam assembly is provided. A composite beam structure extends transversely across a vehicle. A vehicle floor bracket is disposed below the composite beam. A composite reinforcement has a first portion fixedly engaged to the beam structure and a second portion engaged to the vehicle floor bracket.

Embodiments of the first aspect of the disclosure can include any one or a combination of the following features:
   the composite beam structure includes a chopped carbon fiber reinforced with a polymer and the composite reinforcement includes a woven or continuous carbon fiber reinforced with a polymer;
   the polymer includes nylon or polypropylene;
   the composite reinforcement is formed through pultrusion or extrusion and is insertion molded to the composite beam structure;
   the composite reinforcement is straight and has a constant cross-section with a closed outer periphery;
   the first portion of the composite reinforcement is fixedly engaged to a lower medial portion of the composite beam structure, and wherein the composite reinforcement extends vertically between the composite beam structure and the vehicle floor bracket;
   the composite reinforcement is hollow and open ended with one of one or more channels extending from one end to the other;
   the composite reinforcement has one or more side walls and one or more projections extending from and spanning the entire length of the one or more side walls; and
   the composite reinforcement is engaged to the vehicle floor bracket with one or more mechanical fasteners drilled through the composite reinforcement.

According to a second aspect of the present disclosure, a cross car beam assembly is provided. A composite beam structure is configured to extend transversely across a vehicle. A composite reinforcement is formed separately from the composite beam structure and is fixedly engaged to the composite beam structure through an insertion molding process whereby the composite beam structure is injection molded such that the composite beam structure partially surrounds the composite reinforcement.

Embodiments of the second aspect of the disclosure can include any one or a combination of the following features:
   the composite beam structure comprises a chopped carbon fiber reinforced with a polymer and the composite reinforcement comprises a woven or continuous carbon fiber reinforced with a polymer;
   the composite reinforcement is formed separately through pultrusion or extrusion;
   the composite reinforcement is straight and has a constant cross-section with a closed outer periphery;
   the composite reinforcement is hollow and open ended with one or more interior channels extending from end to the other; and
   the composite reinforcement includes a first portion fixedly engaged to a lower medial portion of the composite beam structure and a second portion configured to be engaged to a vehicle floor bracket.

According to a third aspect of the present disclosure, a method of manufacturing a cross-car beam assembly is provided and includes the steps of pultruding or extruding a composite reinforcement, inserting the composite reinforcement in an injection mold, and injection molding a composite beam structure such that the composite beam structure partially surrounds the composite reinforcement, wherein the composite beam structure is configured to extend transversely across a vehicle.

Embodiments of the third aspect of the disclosure can include any one or a combination of the following features:
   the composite beam structure comprises a chopped carbon fiber reinforced with a polymer and the composite reinforcement comprises a woven or continuous carbon fiber reinforced with a polymer;
   the composite reinforcement is straight and has a constant cross-section with a closed outer periphery;
   the composite reinforcement is hollow and open ended with one or more interior channels extending from end to the other; and
   the composite reinforcement includes a first portion fixedly engaged to a lower medial portion of the composite beam structure and a second portion configured to be engaged to a vehicle floor bracket.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary and may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
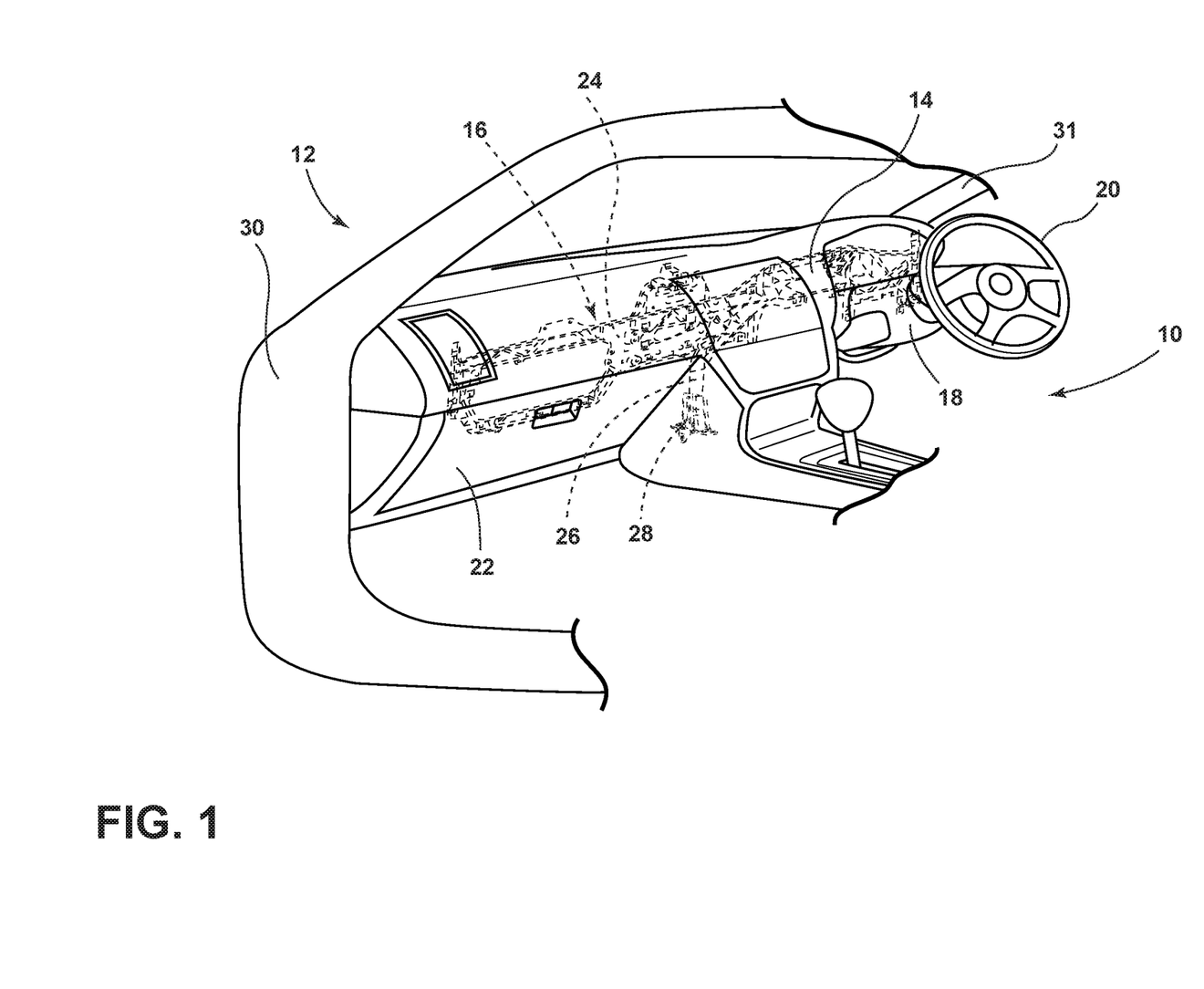
FIG. 1 illustrates a front passenger cabin of a vehicle, wherein a number of loads are at least partially supported by a cross car beam assembly.

Referring to FIG. 1, a front passenger cabin 10 of a vehicle 12 is shown. The front passenger cabin 10 includes an instrument panel 14 at least partially supported by a cross car beam assembly 16 generally shown in phantom lining. For exemplary purposes, the cross car beam assembly 16 may also at least partially support a heating, ventilation, and air conditioning (HVAC) unit (not shown), one or more passenger airbags (not shown), a steering column 18 and a steering wheel 20, and a glove compartment 22. However, it will be understood that the cross car beam assembly 16 may additionally or alternatively support other loads if desired. In addition to providing support for a variety of vehicle components, the cross car beam assembly 16 also functions to provide stability to the vehicle 12 and resist compressive forces caused by vehicle impact.

With continued reference to FIG. 1, the cross car beam assembly 16 is generally positioned vehicle-forward of the instrument panel 14 and includes a composite beam structure 24, a composite reinforcement 26, and a vehicle floor bracket 28. In the depicted embodiment, the composite beam structure 24 extends transversely across the vehicle 12. The composite beam structure 24 may directly support the instrument panel 14 and/or other loads and may be engaged to a vehicle frame, side pillars 30 and 31, and/or other suitable structures of the vehicle 12. The vehicle floor bracket 28 is disposed below the composite beam structure 24 and is configured to partially receive the composite reinforcement 26. The composite reinforcement 26 extends vertically between the composite beam structure 24 and the vehicle floor bracket 28 and is fixedly engaged thereto.

In assembly, the composite reinforcement 26 is formed separately from the composite beam structure 24. Specifically, it is contemplated that the composite reinforcement 26 may be formed through pultrusion or extrusion. Once formed, the composite reinforcement 26 is fixedly engaged to the composite beam structure 24 through an insertion molding process whereby the composite beam structure 24 is injection molded such that the composite beam structure 24 partially surrounds the composite reinforcement 26. With respect to the embodiments provided herein, the composite beam structure 24 includes a chopped carbon fiber reinforced with a polymer such as, but not limited to, nylon or polypropylene. The composite reinforcement 26 includes a woven or continuous carbon fiber also reinforced with a polymer such as, but not limited to, nylon or polypropylene. Advantageously, pultruding or extruding the composite reinforcement 26 and insertion molding the composite reinforcement 26 to the composite beam structure 24 forms a unitary support structure that is lightweight and structurally equivalent to conventional beam structures typically constructed from steel, magnesium, or other metals, and having multiple pieces welded or adhered together. Additionally, pultruded or extruded composites such as composite reinforcement 26 are isotropic and benefit from having a high Young's modulus and a wide array of possible geometries. Accordingly, it is contemplated that other pultruded or extruded composites may be insertion molded to the composite beam structure 24 to provide greater stiffness in high stress areas and design flexibility.

Figure 2:
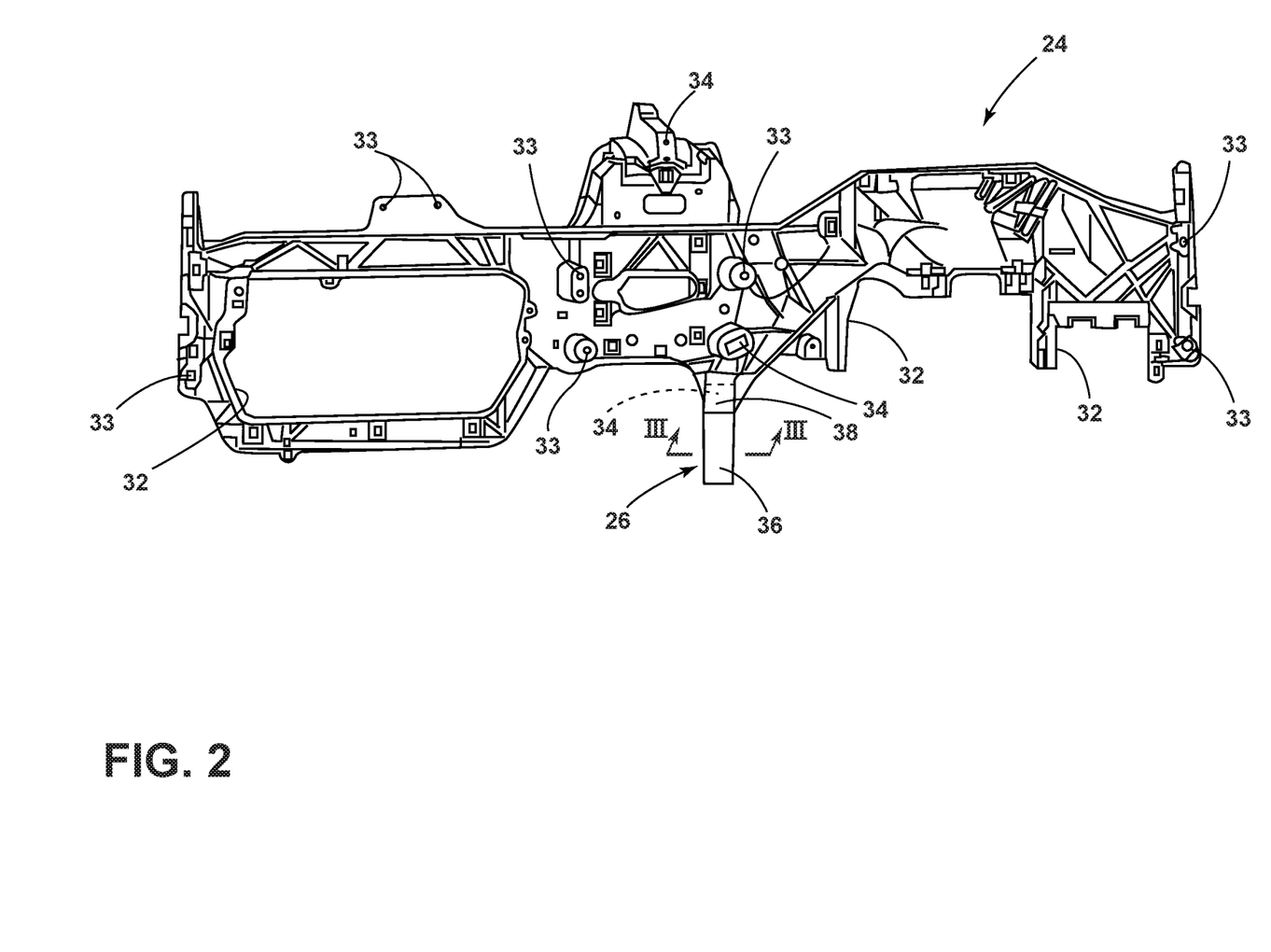
FIG. 2 illustrates a composite beam structure and a composite reinforcement of the cross car beam assembly.

Referring to FIG. 2, the composite beam structure 24 exemplarily includes various frame areas 32 for accommodating different loads as well as attachment points 33 for allowing different loads to be secured to the composite beam structure 24 using mechanical fasteners, adhesives, and the like. The attachment points 33 may also serve to secure the composite beam structure 24 to the vehicle 12. In the depicted embodiment, the composite reinforcement 26 is straight and includes a first portion 34 and a second portion 36. The first portion 34 generally corresponds to an upper extent of the composite reinforcement 26 and the second portion 36 generally corresponds to a lower extent of the composite reinforcement 26. The first portion 34 of the composite reinforcement 26 is fixedly engaged to a lower medial portion 38 of the composite beam structure 24 through the insertion molding process described previously herein. It should be appreciated that additional pultruded or extruded composites may be elsewhere engaged to the composite beam structure 24, including the body and/or peripheral portions.

Figure 3:
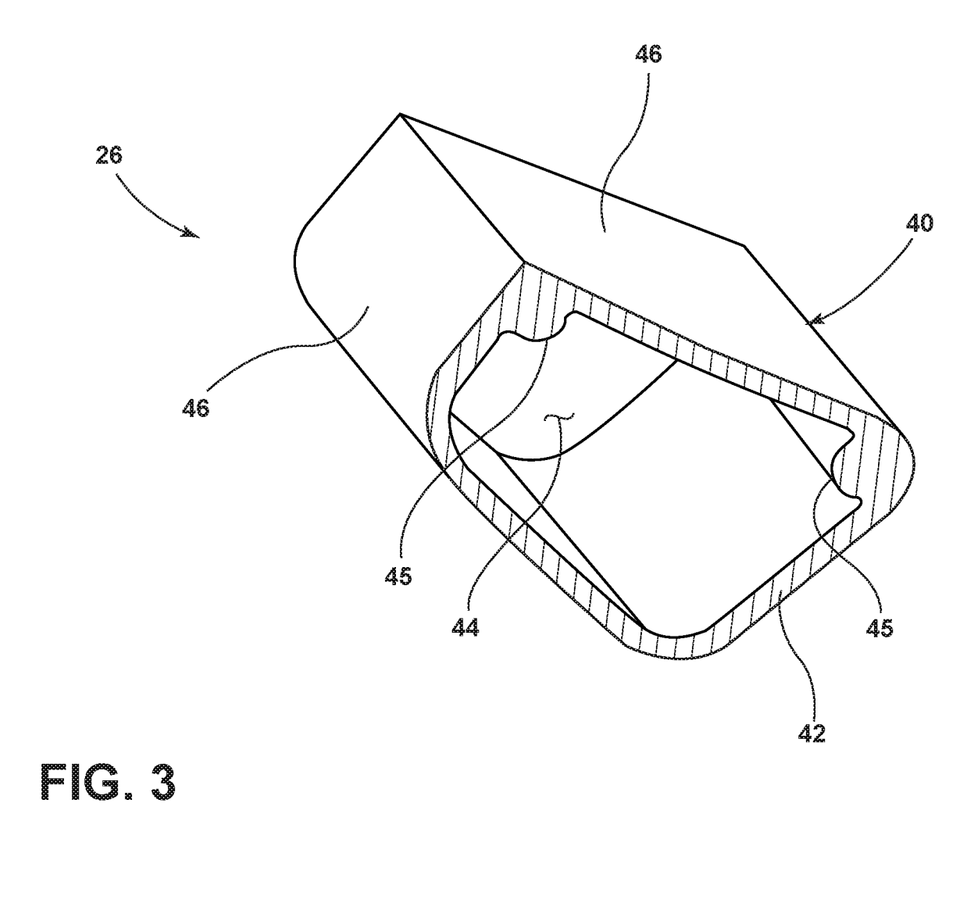
FIG. 3 is a cross-sectional view of the composite reinforcement taken along line of FIG. 2.
Figure 4:
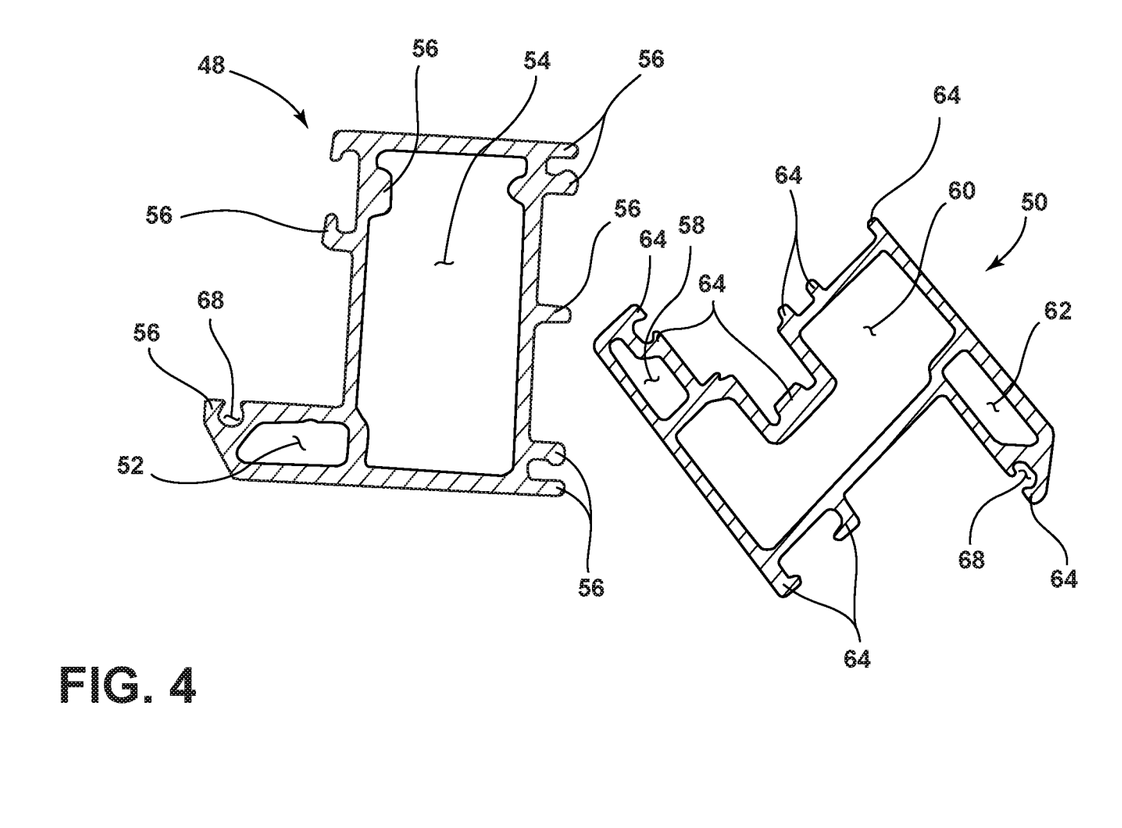
FIG. 4 illustrates alternative embodiments of the composite reinforcement.

Referring to FIG. 3, the composite reinforcement 26 has a constant cross-section 40 with a closed outer periphery 42. Additionally, the composite reinforcement 26 is hollow and open ended with one or more channels 44 extending from end to the other. In some embodiments, the composite reinforcement 26 has one or more projections 45 extending from and spanning the entire length of one or more sidewalls 46 of the composite reinforcement 26. As described herein, pultruded or extruded composites may be formed in a variety of geometries. For example, FIG. 4 depicts two different composites 48, 50, each of which may be provided in place of the composite reinforcement 26 or elsewhere engaged to the composite beam structure 24. Composite 48 is straight and hollow with constant cross-section, and includes two channels 52, 54 along with a plurality of projections 56 extending the entire length of the composite 48. Composite 50 is also straight and hollow with constant cross-section, and includes three channels 58, 60, 62 along with a plurality of projections 64 extending the entire length of the composite 50. It is contemplated that each of the projections 56, 64 may extend inward or outward and may provide rigidity to the composite beam structure 24. Additionally, a portion of the projections 56, 64 may define slots 68 for engagement with other components such as the composite beam structure 24 and/or the vehicle floor bracket 28.

Figure 5:
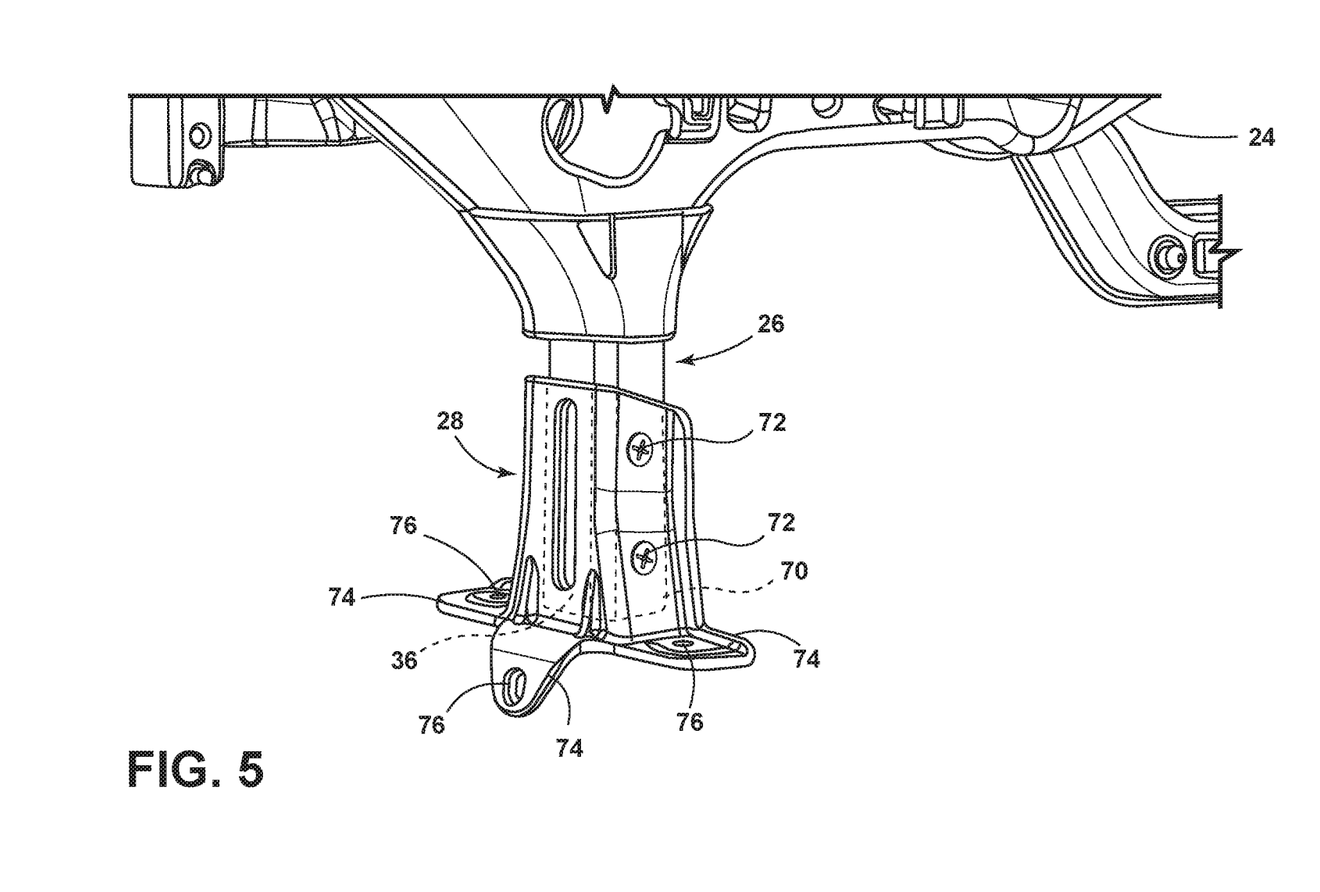
FIG. 5 illustrates the composite reinforcement secured to a vehicle floor bracket.

Referring to FIG. 5, the composite reinforcement 26 is partially received in the vehicle floor bracket 28 through a vertically extending slot 70 sized and dimensioned to accommodate a desired length of the composite reinforcement 26. In the depicted embodiment, the vehicle floor bracket 28 is configured to receive the second portion 36 of the composite reinforcement 26 and may be engaged thereto using one or more mechanical fasteners. For example, one or more screws 72 may be drilled through the composite reinforcement and assembled to corresponding nuts (not shown) to secure the composite reinforcement 26 to the vehicle floor bracket 28. The vehicle floor bracket 28 includes one or more outwardly projecting flanges 74 with attachment points 76 for securing the vehicle floor bracket 28 to the vehicle 12.

Figure 6:
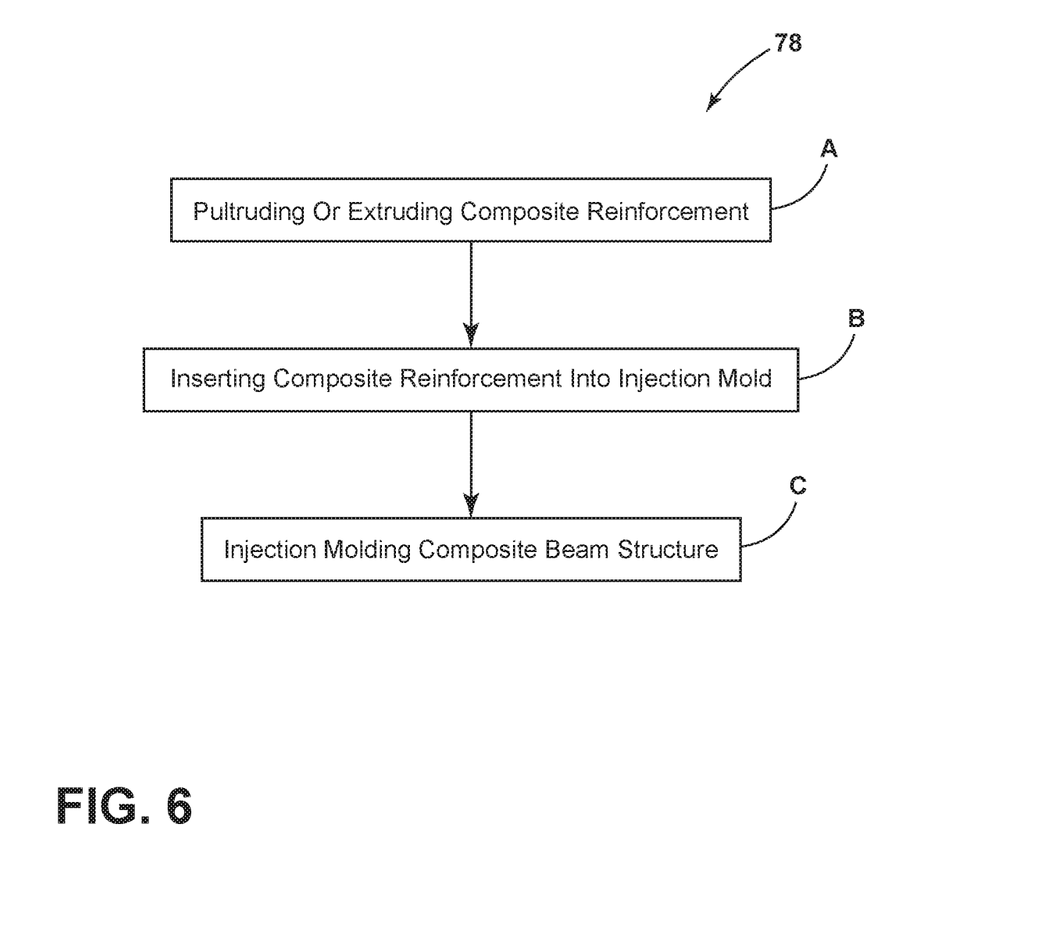
FIG. 6 is a flow diagram of a method of manufacturing the cross car beam assembly.

Referring to FIG. 6, a method 78 of manufacturing the cross car beam assembly 16 is shown in steps A-C. Step A includes pultruding or extruding the composite reinforcement 26. Step B includes inserting the composite reinforcement in an injection mold. Step C includes injection molding the composite beam structure 24 such that the composite beam structure 24 partially surrounds the composite reinforcement 26. As described herein, the insertion molding process fixedly engages the first portion 34 of the composite reinforcement 26 to the lower medial portion 38 of the composite beam structure 24 and the second portion 36 can be engaged to the vehicle floor bracket 28.

Accordingly, a cross car beam assembly has been advantageously provided herein. The cross car beam assembly includes a composite beam structure and a composite reinforcement fixedly coupled thereto. The composite reinforcement is insertion molded to the composite beam structure to provide a unitary support structure capable of supporting various loads. The composite reinforcement is formed through pultrusion or extrusion, and as such, may be shaped in a multitude of geometries. It is contemplated that additional pultruded or extruded composites may be insertion molded to the composite beam structure to provide rigidity in high stress areas. In such an arrangement, the cross car beam assembly confers weight savings without sacrificing structural integrity. Furthermore, the cross car beam assembly benefits from greater design flexibility over conventional offerings.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or numeral of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A cross car beam assembly comprising:
   a composite beam structure extending transversely across a vehicle, the composite beam structure having a lower medial portion;
   a vehicle floor bracket disposed below the composite beam, wherein the vehicle floor bracket defines a vertically extending slot; and
   a composite reinforcement having a closed outer periphery, the composite reinforcement having a first portion fixedly engaged to the beam structure and a second portion disposed within the vertically extending slot of the vehicle floor bracket, wherein the lower medial portion of the beam structure surrounds the closed outer periphery of the first portion, and wherein the vehicle floor bracket surrounds the closed outer periphery of the second portion.

2. The cross car beam assembly of claim 1, wherein the composite beam structure includes a chopped carbon fiber reinforced with a first polymer and the composite reinforcement includes a woven or continuous carbon fiber reinforced with a second polymer.

3. The cross car beam assembly of claim 2, wherein each of the first and second polymers includes nylon or polypropylene.

4. The cross car beam assembly of claim 1, wherein the composite reinforcement is integrally formed with the composite beam structure forming a unitary support structure.

5. The cross car beam assembly of claim 1, wherein the composite reinforcement is straight and has a constant cross-section with the closed outer periphery.

6. The cross car beam assembly of claim 1, wherein the first portion of the composite reinforcement is fixedly engaged to the lower medial portion of the composite beam structure, and wherein the composite reinforcement extends vertically between the composite beam structure and the vehicle floor bracket.

7. The cross car beam assembly of claim 1, wherein the composite reinforcement is hollow and open ended with one of one or more channels extending from one end to an opposing end.

8. The cross car beam assembly of claim 1, wherein the composite reinforcement has one or more side walls and one or more projections extending from and spanning the entire length of the one or more side walls.

9. The cross car beam assembly of claim 1, wherein the composite reinforcement is engaged to the vehicle floor bracket with one or more mechanical fasteners drilled through the composite reinforcement.

10. A cross car beam assembly comprising:
a composite beam structure configured to extend transversely across a vehicle; and
a composite reinforcement formed separately from the composite beam structure and fixedly engaged to the composite beam structure through an insertion molding process whereby the composite beam structure is injection molded such that the composite beam structure extends along a length of the composite reinforcement, the composite beam structure surrounding a closed outer periphery of the composite reinforcement, wherein the composite reinforcement defines a plurality of channels extending therethrough and parallel to one another, each of the plurality of channels having a different cross-sectional shape and size.

11. The cross car beam assembly of claim 10, wherein the composite beam structure comprises a chopped carbon fiber reinforced with a polymer and the composite reinforcement comprises a woven or continuous carbon fiber reinforced with a second polymer.

12. The cross car beam assembly of claim 10, wherein the composite reinforcement is straight and has a constant cross-section with the closed outer periphery.

13. The cross car beam assembly of claim 10, wherein the composite reinforcement is hollow and open ended with the plurality of channels extending from one end to an opposing end.

14. The cross car beam assembly of claim 10, wherein the composite reinforcement includes a first portion fixedly engaged to a lower medial portion of the composite beam structure and a second portion configured to be engaged to a vehicle floor bracket.

* * * * *